United States Patent [19]

Iglesias et al.

[11] Patent Number: 4,767,629
[45] Date of Patent: Aug. 30, 1988

[54] METHOD FOR PREPARING CURED SAUSAGE AND HAM

[76] Inventors: Manuel A. Iglesias, Tabern, 50; Jose V. Arago, Infanta Carlota, 23, both of, Barcelona, Spain

[21] Appl. No.: 108,782

[22] Filed: Oct. 15, 1987

Related U.S. Application Data

[63] Continuation-in-part of Ser. No. 790,260, Oct. 22, 1985, abandoned.

[30] Foreign Application Priority Data

Oct. 22, 1984 [ES] Spain ........................... 537,247

[51] Int. Cl.[4] .................. A22C 11/00; G01N 21/80
[52] U.S. Cl. ............................. 426/55; 364/468; 364/500; 426/233
[58] Field of Search ............... 364/468, 499, 500; 374/14; 73/76; 426/264, 231, 233, 55

[56] References Cited

U.S. PATENT DOCUMENTS

| | | | |
|---|---|---|---|
| 3,627,538 | 12/1971 | Webb et al. | 426/231 |
| 3,800,288 | 3/1974 | Russell | 364/200 |
| 3,887,716 | 6/1975 | Seelbach | 426/233 X |
| 3,890,825 | 6/1975 | Davis | 73/76 X |
| 3,916,670 | 11/1975 | Davis et al. | 73/76 X |
| 4,036,995 | 7/1977 | Koether et al. | 426/233 |
| 4,226,540 | 10/1980 | Barten | 356/237 X |
| 4,299,115 | 11/1981 | Athey et al. | 374/14 X |

*Primary Examiner*—Arthur L. Corbin
*Attorney, Agent, or Firm*—Steinberg & Raskin

[57] ABSTRACT

Production of cured sausage or ham where measurement of pH, rate of change thereof, measurement pertaining to contraction of the sausage or ham, and also rate of contraction thereof, as well as temperature and relative humidity corrections for curing, are carried out in a completely automatic manner by means of a microcomputer which receives signals corresponding to the measurements effected, and in accordance with a program, transmits instructions relating to correction of the temperature or relative humidity.

22 Claims, 5 Drawing Sheets

METHOD FOR PREPARING CURED SAUSAGE AND HAM

This application is a continuation in part of S.N. 790,260, filed Oct. 22, 1985, now abandoned.

BACKGROUND OF THE INVENTION

The present invention relates to method for preparing cured sausage and ham in a completely automatic manner.

Cured sausage, large sausage, smoked pork sausage, etc., are meat products in which the meat is ground to a variable size, depending upon the type of product. The size can range from 20–30 mm for smoked pork sausage, to 2–3 mm for Pamplona smoked pork sausage or large sausage. The sausage contains, in addition, a variable proportion of ground fat, salt spices, and minor quantities of other ingredients.

The mass is packed tightly into a natural or synthetic permeable gut, with the sausage then being subjected to a curing-drying process. This process comprises a fermentation stage and a drying stage.

In the fermentation stage, there is an important microbial development originating from microorganisms which are always present in the meat, or selected seed strains which are added at the time of processing.

In the drying stage, water evaporates from the surface of the gut. This creates a moisture gradient on the inside of the sausage, as a result of which water diffuses towards the external part of the sausage and evaporates therefrom.

Fermentation produces acid (mainly lactic acid) with a resulting fall in pH which, as the pH reaches a value of about 5.4–5.2, induces coagulation of soluble proteins, thus giving rise to hardening of the sausage which acquires texture during the process. In addition, enzymes generated by the microorganisms as the same act upon the meat and the fats, produce changes therein, which result in the development of the typical tastes and aromas characteristic of these products.

As a result of the drying operation, the salts become concentrated and the concentration of water decreases in the sausage. Consequently, together with the decrease in pH previously noted, bacterial activity is hindered until it is completely arrested and the product is stable and can be preserved without refrigeration.

Futhermore, as a result of the drying, consistency and hardness of the sausage increases until the characteristics are obtained which are appropriate for the finished product suitable for consumption.

These two stages are not totally different, although at the beginning, fermentation generally predominates, while at the end, drying is effected.

After the operation involving the packaging of the mass into the gut, the product is often subjected to a heating at low temperature operation which involves maintaining the parts in a chamber with controlled humidity and temperature. In general, the temperatures are relatively high, and range from about 20° to 25° C. These conditions are maintained for about 24 to 28 hours.

This favors a substantial growth of the microorganisms and gives rise to a rapid fall in pH. It is very convenient for the pH to rapidly reach a value of less than 5.5, which impedes the development of undesirable microorganisms which might produce unwanted fermentations of the putrid type, etc.

Once the desired pH has been reached, the drying is continued at a substantially lower temperature (ranging only from about 13° to 17° C.). It is very important for the fall in pH to be perfectly controlled, so that excessively low values (pH lower than about 4.9–5.0) are not reached, because the quality of the product decreases greatly as a result of the formation of acidic aromas and tastes. The firmness of the product itself is also occasionally adversely affected.

The final stage of the heating operation must therefore occur as a function of the pH reached and the rate of fall thereof. It is possible, for example, to correctly terminate the heating operation when the pH reaches a value of 5.2 if the rate of fall is low, since the final pH reached would be, for example, 5.0. However, on the other hand, it might be too late if the rate of fall of the pH is too high, for in that instance, it is probable that final values of about 4.6–4.7 will be reached.

In such cases, which occur less frequently, in which the heating operation is not employed, but in which the sausage is subjected to a relatively low temperature from the beginning, it is also vital to control the pH although the falling thereof will occur much more slowly than in the heating operation.

In order to exert satisfactory control over fermentation, it is necessary to be provided with a curve relative to the fall in pH which will make it possible to determine the appropriate end of the heating operation.

However, this is not sufficient to ensure the perfect curing for when the more active fermentation stage has ended and the pH remains constant or shows very little variation, the major part of the drying operation still remains to be executed, which lasts much longer than the heating step.

Correct drying is absolutely essential for production of a high quality sausage. Two problems may occur:

(1) An excessively high rate of drying. If the rate of evaporation is too high when a high proportion of moisture remains in the sausage, then the external layers of the piece of sausage involved will become dehydrated without diffusion of water from the center of the piece being able to compensate for such loss of moisture.

This results in the formation of a thin external ring of well-cured mass with the typical color of dried sausage (shrunken material), while in the internal part of the piece of sausage, the mass remains moist and soft with a much lighter color which very often turns out to be grayish. The aroma and taste are extremely adversely affected;

(2) Excessively slow drying. An excessively slow drying operation with a resulting increase in drying time, has negative economic ramifications due to the high cost of capital immobilized for drying the sausage.

Furthermore, excessively low drying can have undesirable effects on the quality of the sausage. Maintaining of a high humidity inside the pieces of sausage for a prolonged period of time, favors unwanted fermentations which affect aroma, taste and color.

Control of the drying operation is carried out by acting upon the surrounding conditions of temperature and relative humidity, which are the conditions determining the rate of evaporation. The information required to carry out this control involves the knowledge of the weight of the pieces of sausage at each moment. Several sausages are chosen as controls, the weight of which is measured systematically during the process. On the basis of this data, weight loss from the beginning of the drying operation, as well as the value of the rate of decrease during each time interval, can be calculated.

Presently, monitoring of curing chambers for the sausage is effected manually on the basis of information obtained concerning the evolution of pH and contraction of the items or pieces of sausage.

During the heating operation, at the beginning of the process, the pH of the pieces is measured manually from time to time. On the basis of this data so obtained, it has been possible to calculate the absolute value of shrinkage, as well as the rate of shrinkage. The weight is monitored until the end of the curing process.

With this data, technical personnel in charge of the operation can make decisions, i.e. decide that the heating operation has been completed, increase or decrease in the temperature is warranted to accelerate or slow down the fermentation, increase or decrease in the rate of shrinkage is required, decrease in the relative humidity and/or increase in the temperature is required, or to the contrary, increase in the relative humidity and/or decrease in the temperature is warranted.

Although modern curing chambers have been used, it has been necessary to carry out this monitoring manually.

The only function of automatic control had been to maintain the two parameters to be controlled (relative humidity and temperature) between the minimum and maximum values which were previously manually set.

On the basis of such information regarding pH and weight obtained for the sausage, the technical personnel could decide whether or not to change the prescribed limits. In other words, the monitoring of the process did not include any "feed-back" loop or, i.e. this loop was effected manually.

SUMMARY OF THE INVENTION

Accordingly, it is an object of the present invention, to improve curing of sausage and ham.

It is also an object of the present invention to better control drying/fermentation during the curing of sausage and ham.

It is another object of the present invention to facilitate ease of curing of sausage and ham, notably the drying and fermentation thereof.

It is a further object of the present invention to provide for more frequent or continuous monitoring and adjustment of the curing of sausage and ham.

It is yet another object of the present invention to eliminate the possibility of error in the curing of sausage and ham.

It is yet a further object of the present invention to improve and conserve economies and energy involved in the curing of sausage and ham.

It is even another object of the present invention to provide for automatic monitoring and control in the curing of sausage and ham.

These and other objects are provided by the present invention which is directed to a method for preparing cured sausage and ham, in which the measurement of pH and the rate of change thereof, the measurements pertaining to contraction of the sausage and also to the rate of such contraction thereof, as well as temperature and relative humidity corrections, are executed in a completely automatic manner, by means of a microcomputer which receives signals corresponding to the measurements effected, and in accordance with a program, transmits instructions relating to correction of the temperature and relative humidity, by means of which processing action is taken much more frequently than in the conventional manual processes, with the result that optimum quality is obtained in the product, and the possibility of human errors of measurement, manipulation, or monitoring during the curing, are minimized or entirely avoided.

The microcomputer advantageously comprises a specific, appropriate program for each type of product to be produced, incorporating the technical and economic criteria selected.

The microcomputer program also advantageously eliminates the need for measurement of pH relative to the curing and drying of hams.

According to another advantageous feature, the microcomputer receives information concerning the ambient temperature and relative humidity outside of the curing chamber, and transmits instructions for admission of ambient air from outside to inside the chamber, when the conditions so require.

In the method according to the present invention, operation is completely automatic, and comprises an astute system provided with a "feedback" loop.

As can be understood from the above, the advantages provided by this type of monitoring are quite clear, in comparison with the devices previously used. With the present invention, it is possible to take action much more frequently than with manual monitoring, making it possible to invariably obtain optimum quality. On the other hand, possibility of human error is minimized or entirely avoided, which has extremely important economic consequences in view of the high value of the product and the large number of pieces of sausage or ham present in the dryer or curing chamber.

As is also clear from the above, the microcomputer is provided with a program which allows it to make decisions as to how and when the curing conditions are to be modified.

A large number of different concrete programs may be applied for a given type of chamber, depending on the type of sausage to be produced, and the economic criteria to be adopted.

DESCRIPTION OF THE PREFERRED EMBODIMENTS

The method of the present invention will be more clearly explained by the following description of the production of a cured sausage, which is in no way restrictive of the scope of the present invention.

Initially, limits concerning the heating operation (for example, at temperatures ranging from about 22° to 24° C.) and low limits concerning relative humidity, are set which the microcomputer monitors so that the rate of shrinkage falls between 2 and 3% per day. At this stage of the process, substantial shrinkage may occur without any danger of reduction.

The microcomputer makes a decision, based upon the value of the pH and the rate of fall thereof, as to when the heating operation is completed. At that moment, the temperature is lowered and new limits are set, such as, for example, ranging from about 13° to 15° C.

It is necessary to decrease the permitted rate of contraction, for example to a value close to 1% a day, and to change the temperature and relative humidity limits as a function of several criteria which, in part, may be of an economic nature. Thus, for example, if it is desired to increase the rate of drying, then it would always be more economical to increase the temperature rather than to lower the relative humidity. If it is desired to decrease the rate of drying, then it would also always be more economical to increase the relative humidity rather than decrease the temperature.

The microcomputer can therefore make decisions in accordance with the criteria noted, whenever certain set limits of the temperature and relative humidity are not exceeded. In case this happens, the rate of drying is to be controlled using other more expensive procedures.

If the microcomputer receives information regarding conditions of ambient relative humidity and temperature outside of the curing chamber, it may also make a decision, when conditions are suitable, for admitting air from outside the curing chamber in order to change internal conditions therein, instead of using its own air-conditioners, thus leading to a substantial saving in energy. In order for this to be possible, the curing chamber must naturally be disposed for admission of air from outside.

This previous description is not at all restrictive of the present invention, with many other kinds of programs which may be more sophisticated, being applicable in accordance with the present invention.

A curing chamber of this kind could also be used to dry hams, in which case it would not be necessary to take pH readings monitoring of the process would be based only on the measurement of weight. The elimination of automatic pH readings could also be of value in all cases in which it may be preferable, for economic and other considerations, to do away with automatic pH measuring devices and carry out such measurement manually.

Figure 1:
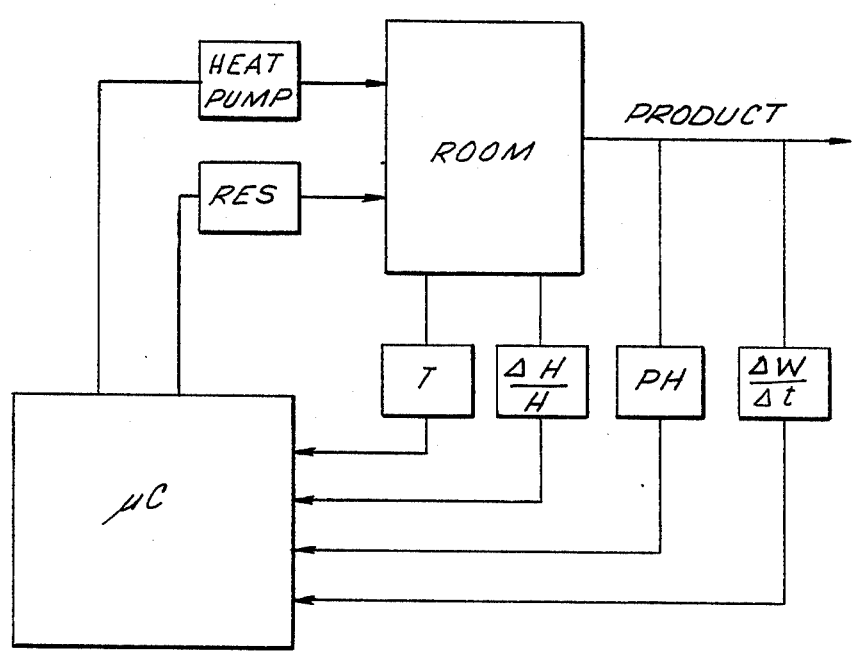
FIG. 1 is a schematic illustration of the method in accordance with the present invention.

More particularly, referring to the figures, FIG. 1 illustrates a flow chart or diagram for accomplishing the method of the present invention. As shown in this figure, the temperature (T) and relative humidity ($\Delta H/H$) of the room or chamber in which the curing is carried out, is controlled by means of a heat pump or electrical resistances (RES). The air of the room can be dried and cooled by means of the heat pump, and also heated by inverting the circulating flow of the heat pump. Resistances are used when only heating is needed.

pH and contraction, or rate of contraction thereof ($\Delta W/\Delta t$) are measured in the product and directed to a microcomputer ($\mu C$) so that the microcomputer can actuate the heat pump or resistances which then provide the room with suitable temperature and relative humidity according to the pH and contraction or rate thereof that have been measured.

Figure 2:
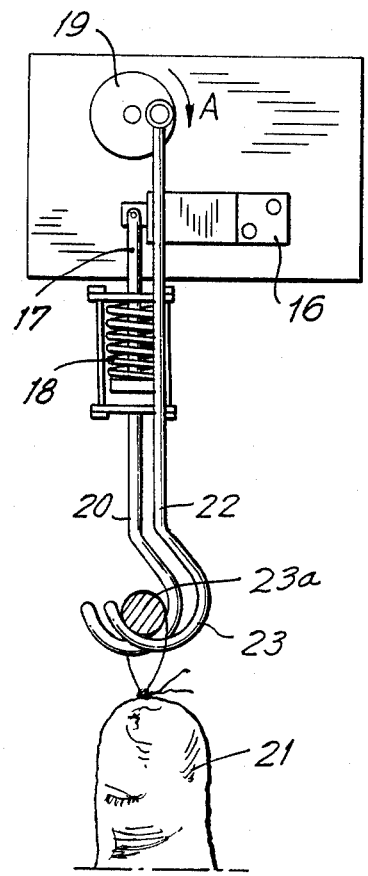
FIGS. 2 and 3 are elevational views illustrating apparatus for measuring contraction of a sausage or ham product in accordance with the present invention.
Figure 3:
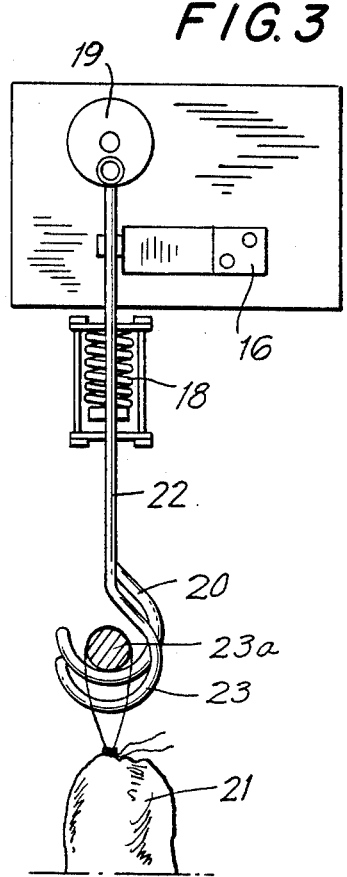

FIGS. 2 and 3 illustrate particular apparatus for measuring contraction of a sausage or ham product. In particular, the apparatus in FIG. 2 comprises a charge cell 16 which provides electrical tension of a value related to the weight applied. The weight of a product 21 is applied to the charge cell 16 by means of a rod 17 integral with a spring 18, while a servo motor (not illustrated) drives an eccentric cam 19 which releases the cell 16 when weighing is not carried out.

The rod 17 is coaxial with a first hook 20 supporting the product 21, while the eccentric cam 19 drives an arm 22 with a second hook 23 located near the first hook 20. The second hook 23 supports the product 21 when no weight acts in the cell 16 (FIG. 2).

In FIG. 3, the hook 23 is in a lower position, i.e. when weight is applied onto the hook 20 by the product 21, and thereby applied on the charge cell 16 (the cam 19 has rotated in the direction of arrow A in FIG. 2). As also seen in FIGS. 2 and 3, the product 21 is supported upon hooks 20 and 23 by being connected to a supporting member 23a. This measuring apparatus illustrated in FIGS. 2 and 3 is disclosed in Spanish patent application No. 537,245, filed Oct. 22, 1984. The charge cell 16 is connected with microcomputer uC as illustrated in FIG. 1 ($\Delta W/\Delta t$).

Apparatus for measuring pH essentially comprises detecting means for the pH having a sensor which provides electrical tension related to the pH and a blade for protecting the sensor and for facilitating penetration of the sensor into the product being cured. The detecting means are driven by hydraulic and electro-mechanical means, with this apparatus being described in Spanish patent application No. 537,246, filed Oct. 22, 1984. The hydraulic and electro-mechanical means are controlled by the microcomputer uC in order to automate the measuring of pH. The measured pH information is directed to the microcomputer uC, as illustrated in FIG. 1.

In the method of the present invention, the range of relatively high temperature may be about 18°–50° C., while the range of relatively low temperature may be about 6° to 18° C., while the relative humidity is generally maintained in the range of about 65 to 100%.

Figure 4:
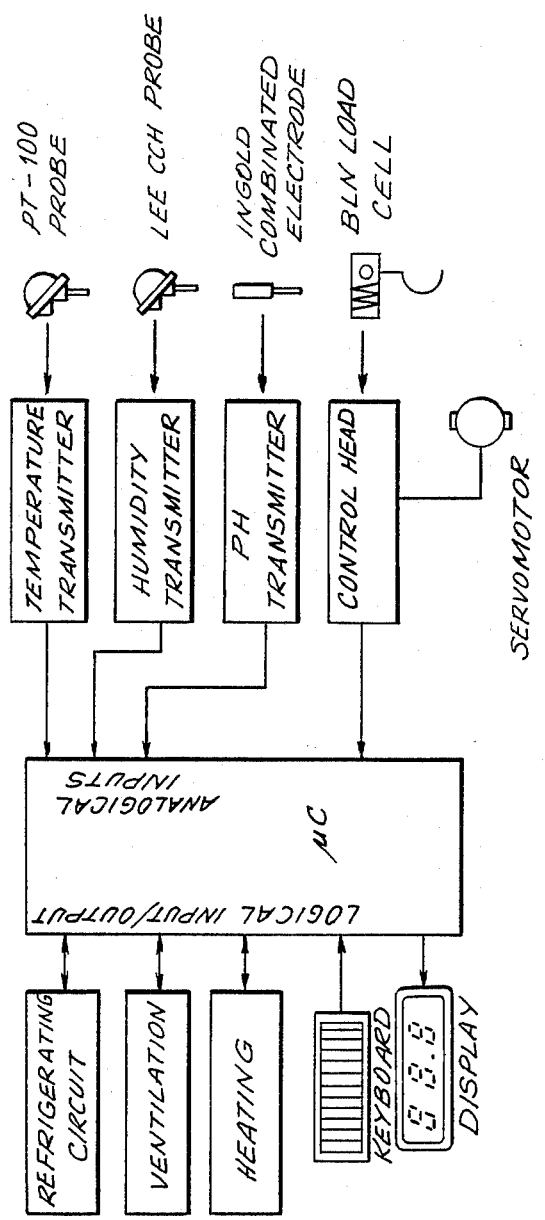
FIG. 4 is a schematic illustration of a flow diagram together with a control device therefor, in accordance with the present invention.

Referring to FIG. 4, as a control device uC in accordance with the present invention, a SIRTEK CDP-80 microcomputer is used, which is specifically adapted for data acquisition tasks and for controlling an industrial entourage. This microcomputer comprises several input channels for receiving respective analog input signals having amplitudes in the range of about 4 to 20 ma from temperature, humidity and pH transmitter sensors, and for digitizing the analog input signals. The microcomputer also comprises series communication channels which connect the control head of the scales to the microcomputer as illustrated in FIG. 4, in accordance with standard computer RS 232-C language.

The input/output logic module of this microcomputer has 32 inputs and 24 output relays, which are used to control handling of the refrigerating circuit, the ventilation (humidity control) and the heating resistances.

The control program serves as a humidity and temperature control for handling reference signals, wherein the humidity reference signal is automatically corrected to reach desired rate of contraction. At fixed intervals of time (e.g. 15 minutes), a few weight readings are taken, through which an estimate of rate of contraction of the product is made by means of a numerical process. By comparing this rate with the predetermined reference signal value, the humidity reference signal is obtained with the climatic (humidity) conditions being controlled, starting from the determined humidity reference signal.

The microcomputer also comprises an alphanumeric keyboard with several function keys and an alphanumeric display of 16 characters. Contents of different records in the microcomputer can be exhibited on this display. The content of any record can be seen on the display at any moment. By pressing the key of "advance", the contents of the following record will be presented, and so on. When all the existing records have been seen, the first such record in the sequence will again appear upon the display screen.

Although the content of many records will be modified by the microcomputer during the process, these records can also be modified manually when appearing upon the display, by using the numerical keyboard and finally pressing the value confirmation key. Some of the records which correspond to the instrumental measuring are as follows:
relative humidity
temperature °C. (room)
tare of the scales
initial weight of the sample
contraction of weight
contraction rate
relative humidity (external air)
temperature (external air)

There are additionally other sets of records which permit establishing a programming of the process in phases. For each phase, a set of reference signals can be established. The programming of the phases are carried out by the keyboard. These reference signals may be:
temperature
relative humidity
pH
contraction rate
time For measuring temperature, a pt-100 sensor (100° to 0° C.) with a signal adapter is used. This sensor transmits to the control computer a signal from about 4 to 20 ma for a temperature margin from about −20° to 100° C. A capacitive sensor (CCH, Humidity Sensor of Lee Integer Ltd) sensitive to the relative humidity, is also connected to the signal adapter circuit, and is used for measuring the relative humidity. This sensor transmits a signal from about 4 to 20 ma for a humidity margin of 0 to 100% to the control computer. A combined electrode of glass (Ingold) with an adapter circuit therefor, are used for measuring the pH, and transmit to the control computer, a signal of about 4 to 20 ma for a margin of 0 to 14 units of pH. Two load cells of 15 kgs (BLN) mounted in a system with a servomechanism with self zero and a measuring and control head, are used for obtaining the weight of the product. The head communicates with the computer by means of a R, S232-C data line.

EXAMPLE 1

Production Of Sausage

Typical programming for production of sausage may be as follows:

FIRST PHASE reference signal of temperature (T)
reference signal of relative humidity ($\Delta H/H$)
programmed interval of time between measuring of pH ($\Delta t/pH$).
reference signal of pH (pH)

In this first phase, the heating at low temperature takes place, during which the development of fermentation microorganisms occurs. Typical values of temperature are 22°–27° C. and for relative humidity (RH), 80–90%. This step takes place at a fixed temperature and RH, and ends when the pH reaches the reference signal value.

Generally, the contraction is not controlled because the humidity of the product is greatest and steady, and a "crust" (an external, impermeable coat produced by too quickly drying) does not form. The length of this first phase is between 48 and 72 hours.

Measuring pH is complicated in this first phase. It is not possible to continuously prick the sausage with the electrodes, because of a proteic film covering the sausage, and the readings will not all be entirely accurate.

The electrodes must be washed and calibrated before each measuring, and must be kept clean and immersed in a buffer solution between two measurings. An automatic pH measuring apparatus may be used to automatically carry out the pH measuring. However, a semiautomatic pH measuring apparatus may generally be used, since automatic measuring is complicated and expensive. In this instance, at regular intervals, e.g. every 4 hours, an alarm sounds and points out that it is time for measuring pH. The pH electrodes are connected to the microcomputer. When a measurement is taken, a "measure" button in the interconnection box is pressed and the analog value of the pH is read and converted into a digital value by the microcomputer.

SECOND AND SUBSEQUENT PHASES

In these phases, typical programming involves the following:
reference signal of temperature (T)
reference signal of contraction rate ($\Delta W/\Delta t$)
reference signal time (t)
reference signal of frequency of weighing (weighing frequency)

These phases involve drying of the sausage. It is not necessary to control pH during these phases because the fermentation process is almost completely finished. The operation temperature is much lower than in the first phase, typically between 10°–16° C. Additionally, relative humidity RH is also monitored during this phase, but normally not by way of a fixed reference value. Rather, humidity is initially set at a definite value, e.g. 80%, and then modified all throughout this latter phase.

In this phase and in any subsequent phases, control is designed to maintain constant temperature and rate of contradtion, equal to the reference signals manually introduced above. Too fast a contraction rate will cause superficial hardness, while too slow a rate could result in undesirable fermentations.

The microcomputer maintains the values of the temperature and the RH within the corresponding reference signals, and at the same time measures rate of contraction. If the measured rate of contraction is different from the reference signal, then the rate of contraction is corrected by modifying the reference signal of RH, e.g. once every two hours. An increase of the RH reference signal lowers the rate of contraction, while a decrease of the RH value increases the rate of contraction or drying. For a sausage of 7 mm. in diameter, an increase of 1–3% in the loss of weight per day, corresponds to a decrease of 1% in the relative humidity, RH.

Thus, the loss of weight is correlated to the programmed rate of contraction which can be from 0.5 to 3% of the rate of loss of weight and varies according to phases. The final phase takes place when the established reference time is reached. Once a phase is completed, then the following phase begins which can have different reference signal values. In certain instances, the first phase is not carried out, and the entire operation is executed from the beginning with the low temperatures of the second phase.

Figure 5:
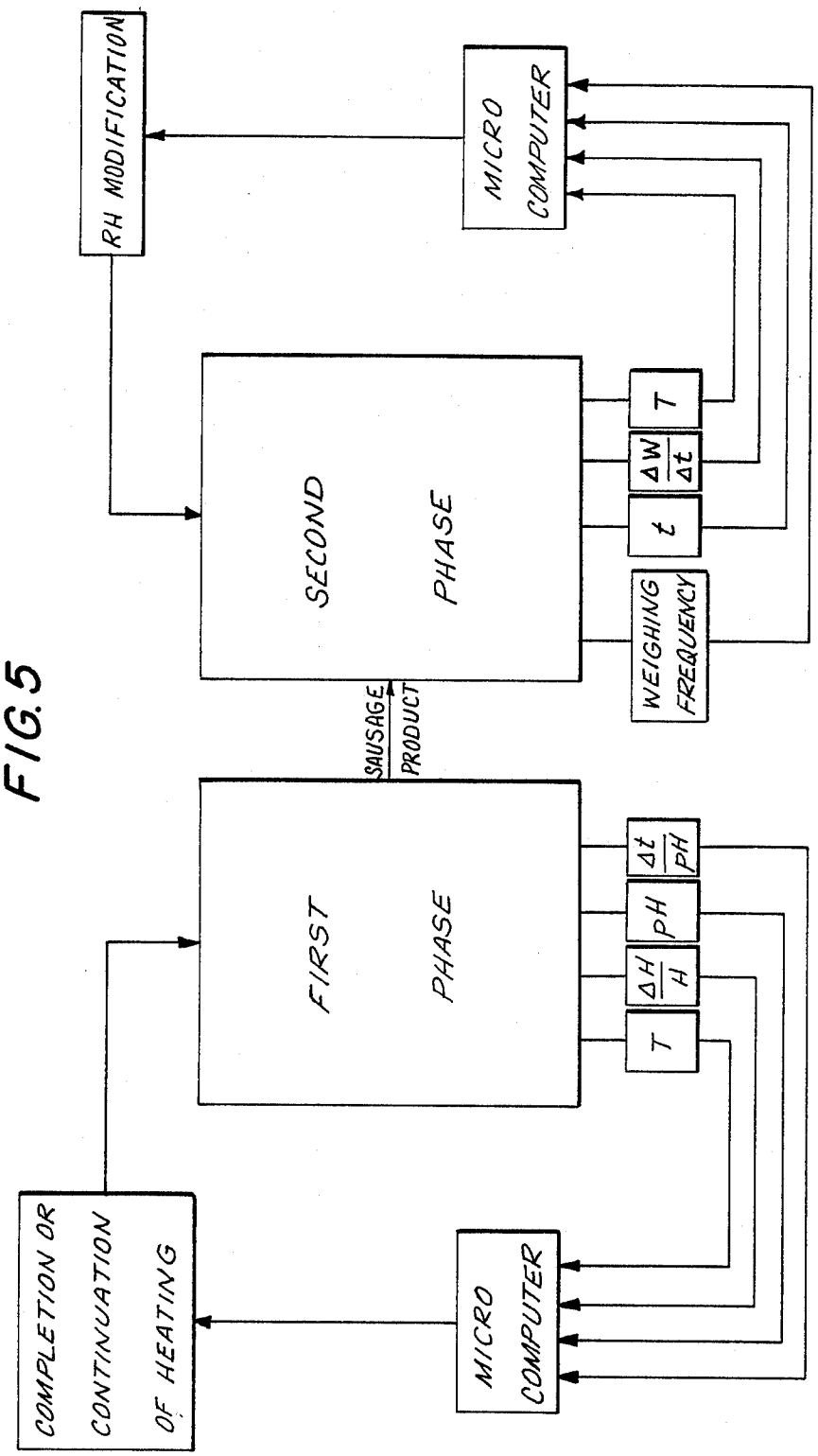
FIG. 5 is a schematic flow-chart of one embodiment of the present invention.
Figure 6:
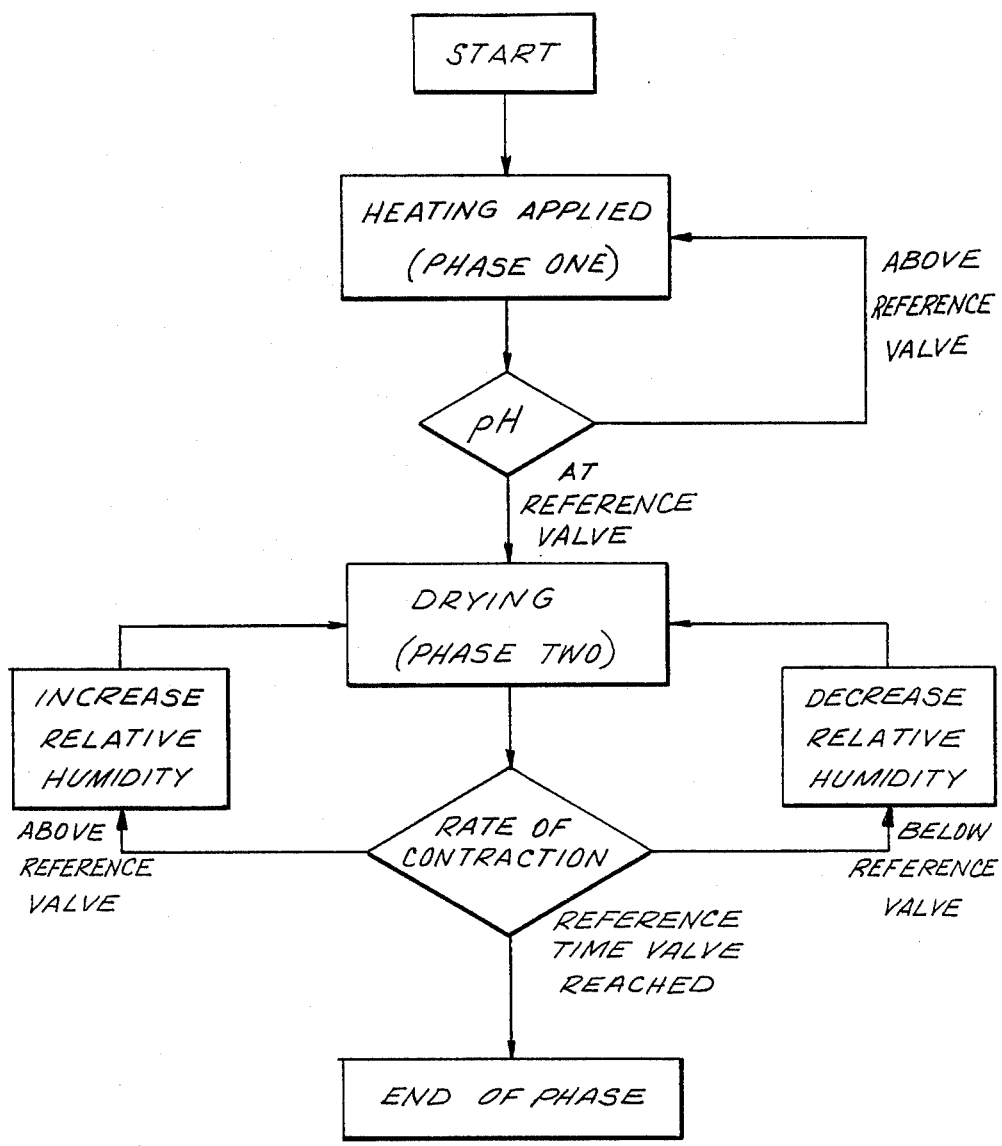
FIG. 6 is a flow-chart of a logic sequence in accordance with FIG. 5.

FIG. 5 is a schematic flow chart of the method outlined in Example 1 above, while FIG. 6 is a more detailed flow chart of a logic sequence, i.e. of the controller used in accordance with the present invention.

EXAMPLE 2

PRODUCTION OF HAM

The treatment of ham was carried out in a similar manner to Example 1, but with the following differences. The rate of weight loss is much smaller (0.1 to 0.35% per day). There is no initial heating, but heating can be provided at the end of the process. Although there is no development of microorganisms, the high temperatures provided by the subsequent heating may conveniently facilitate action of enzymes developing the flavor and smell.

The preceding description of the present invention is merely exemplary, and is not intended to limit the scope thereof in any way.

What is claimed is:

1. In a method for preparing cured sausage, said method comprising the steps of
    drying a piece of sausage at a high temperature,
    monitoring at least one of pH, rate of change of pH, contraction of the piece, and rate of contraction of the piece, during the drying step,
    drying the dried and monitored piece at a temperature lower than said high temperature,
    monitoring at least one of the contraction and rate of contraction of the piece during the subsequent drying step, and
    adjusting at least one of temperature and relative humidity of surroundings in accordance with the two monitoring steps during the two respective drying steps,
    the improvement comprising the steps of
    automatically carrying out the respective monitoring steps and the adjustment step with a microcomputer by
    sending signals corresponding to the respective monitorings to the microcomputer,
    pre-disposing an instructional program within the microcomputer, and
    transmitting instructions from the microcomputer for the adjustment of at least one of the temperature and the relative humidity,
    whereby corrective adjustment takes place much more frequently than in conventional manual methods, and optimum quality of product is produced with minimization or prevention of human error in judgment, manipulation, and monitoring.

2. In the method of claim 1, the improvement further comprising the step of
    changing the pre-disposed instructional program to fit desired parameters for a particularly-desired product.

3. In the method of claim 1, the improvement comprising the additional steps of
    monitoring at least one of ambient temperature and relative humidity surrounding a curing chamber for the sausage,
    transmitting signals corresponding to the ambient monitorings to the microcomputer, and
    transmitting instructions from the microcomputer for admitting ambient air into the curing chamber based upon the signals analyzed by the microcomputer.

4. In the method of claim 1, the improvement comprising the additional step of
    providing the microcomputer with a feedback loop.

5. In the method of claim 1, the improvement wherein the temperature is adjusted by the microcomputer to fall from a range of about 22°–24° C. in the first drying step to about 13°–15° C. in the second drying step.

6. In the method of claim 1, the improvement wherein the rate of contraction is adjusted by the microcomputer to fall from a rate of about 2–3% a day to a rate of about 1% a day.

7. In the method of claim 1, the improvement wherein the microcomputer increases the temperature to thereby increase the rate of drying.

8. In the method of claim 1, the improvement wherein the microcomputer increases the relative humidity to lower the rate of drying.

9. In the method of claim 1, the improvement wherein the temperature is adjusted by the microcomputer to fall from a range of about 20°–25° C. in the first drying step to about 13°–17° C. in the second drying step.

10. In the method of claim 1, the improvement wherein the pH is adjusted by the microcomputer to fall from a range of about 5.5 in the first drying step to a range not below about 4.9–5.0 in the second drying step.

11. In a method for preparing cured sausage comprising the steps of
    drying a piece of sausage,
    monitoring at least one of pH and contraction of said piece, and
    adjusting at least one of temperature and relative humidity of surroundings in accordance with the monitoring step,
    the improvement comprising the steps of
    automatically carrying out the respective monitoring and adjustment steps with a microcomputer by
    sending signals corresponding to the respective monitorings to the microcomputer,
    pre-disposing an instructional program within the microcomputer, and
    transmitting instructions from the microcomputer for adjusting at least one of the temperature and relative humidity,
    whereby corrective adjustment takes place much more frequently than in conventional manual processes, and optimum quality of product is produced with minimization or prevention of human error in judgment, manipulation, and monitoring.

12. In a method for preparing cured ham, said method comprising the steps of
    drying a piece of ham at a high temperature,
    monitoring at least one of contraction of the piece and rate of contraction of the piece during the drying step,
    drying the dried and monitored piece at a temperature lower than said high temperature, monitoring at least one of the contraction and rate of contraction of the piece during the subsequent drying step, and adjusting at least one of temperature and relative humidity of surroundings, in accordance with the two monitoring steps, during the two respective drying steps, the improvement comprising the steps of automatically carrying out the respective monitoring steps and the adjustment step with a microcomputer by sending signals corresponding to the respective monitorings to the microcomputer, pre-disposing an instructional program within the microcomputer which dispenses with monitoring of pH and rate of change of pH, and transmitting instructions from the microcomputer for the adjustment of at least one of the temperature and the relative humidity, whereby corrective adjustment takes place much more frequently than in conventional manual methods, and optimum quality of product is produced with minimization or prevention of human error in judgment, manipulation and monitoring.

13. In a method for preparing cured ham, comprising the steps of drying a piece of ham, monitoring contraction of said piece, and adjusting at least one of temperature and relative humidity of surroundings in accordance with the monitoring step, the improvement comprising the steps of automatically carrying out the respective monitoring and adjustment steps with a microcomputer by sending signals corresponding to the respective monitorings to the microcomputer, pre-disposing an instructional program within the microcomputer which dispenses with monitoring of pH and rate of change of pH, and transmitting instructions from the microcomputer for adjusting at least one of the temperature and relative humidity, whereby corrective adjustment takes place much more frequently than in conventional manual processes, and optimum quality of product is produced with minimization or prevention of human error in judgment, manipulation, and monitoring.

14. A method for preparing cured sausage, comprising the steps of heating a piece of sausage at a temperature level to develop microorganisms and thereby ferment the sausage, monitoring pH of the sausage during the heating, sending signals corresponding to the pH monitoring to a microcomputer, pre-disposing an instructional program within the microcomputer, transmitting instructions from the microcomputer to maintain the heating when the monitored pH is above a predetermined value or to discontinue the heating when the monitored pH reaches said predetermined value, drying the heated piece at a temperature lower than said temperature level, after discontinuing the heating thereof, monitoring rate of contraction of the sausage piece during the drying thereof, sending signals corresponding to the rate of contraction monitoring to the microcomputer, and transmitting instructions from the microcomputer to adjust relative humidity of surroundings by increasing the relative humidity when the rate of contraction is above a certain value, and decreasing the relative humidity when the rate of contraction is below a certain value.

15. The method of claim 14, comprising the additional step of transmitting instructions from the microcomputer to terminate the step of drying after a predetermined time period is reached.

16. The method of claim 14, wherein the step of heating is carried out at substantially constant temperature and relative humidity.

17. The method of claim 14, wherein the heating is carried out at a temperature of 22°–27° C., at a relative humidity of 80–90%, and for a time of 48–72 hours.

18. The method of claim 14, wherein the pH is monitored automatically.

19. The method of claim 14, wherein the pH is monitored semi-automatically.

20. The method of claim 14, wherein the lower temperature during the drying is between 10°–16° C.

21. A method of preparing ham, comprising the steps of drying a piece of ham at a particular temperature level and at a particular level of relative humidity, monitoring rate of contraction of the piece during the drying thereof, sending signals corresponding to the rate of contraction monitoring to a microcomputer, pre-disposing an instructional program within the microcomputer, transmitting instructions from the microcomputer to adjust relative humidity of surroundings by increasing the relative humidity when the rate of contraction is above a certain value, and decreasing the relative humidity when the rate of contraction is below a certain value.

22. The method of claim 21, comprising the additional step of after completion of the drying, heating the piece to facilitate action of enzymes which develop flavor and smell.

* * * * *